United States Patent [19]

Biederman et al.

[11] 4,327,764
[45] May 4, 1982

[54] FLOAT VALVE ASSEMBLY FOR A LIQUID DRAIN TRAP

[75] Inventors: Richard Biederman, Kensington; Ronald A. Zurawski, Laurel, both of Md.

[73] Assignee: Superpressure, Inc., Silver Spring, Md.

[21] Appl. No.: 152,041

[22] Filed: May 21, 1980

[51] Int. Cl.³ .............................................. F16K 31/22
[52] U.S. Cl. ...................................... 137/192; 137/433
[58] Field of Search ......................... 137/192, 202, 433

[56] References Cited

U.S. PATENT DOCUMENTS

| 635,703 | 10/1899 | St. Mary | 137/192 |
| 1,304,562 | 5/1919 | Hammell | 137/192 |
| 3,149,640 | 9/1964 | Klinefelter | 137/202 |
| 4,079,743 | 3/1978 | Weston | 137/192 X |

Primary Examiner—Alan Cohan

Attorney, Agent, or Firm—Herman L. Gordon

[57] ABSTRACT

The float valve assembly is mounted in a liquid drain trap housing having an upper centrally located orifice and a lower centrally located outlet orifice and includes a float, an upper pin fixed to the top of the float and received in the upper orifice, a lower pin fixed to the bottom of the float in axial alignment with the upper pin and received in the lower orifice, a conical or semispherical valve seat at the lower end of the lower pin, and a mating valve seat-forming O ring clamped in the lower orifice. The upper and lower orifices are in axial alignment and form an alignment configuration for the float valve assembly by receiving therein the upper and lower pins and maintain them in generally vertical alignment. This ensures proper vertical seating and unseating of the conical or spherical valve seat on the O ring valve seat which is clamped within the lower orifice.

11 Claims, 3 Drawing Figures

FLOAT VALVE ASSEMBLY FOR A LIQUID DRAIN TRAP

BACKGROUND OF THE INVENTION

1. Field of the Invention

The present invention relates to a float valve assembly used in a liquid drain trap forming part of a high pressure liquid and gas separating apparatus and more particularly to a vertically aligned float valve assembly wherein the upper and lower orifices to the drain trap provide vertical alignment for a valve of the assembly.

2. Description of the Prior Art

Heretofore most float valve assemblies utilized in a liquid drain trap forming part of a high pressure liquid and gas separating apparatus have been cantilevered so that the upper valve seat will travel through an arc from a valve open to a valve closed position and this did not provide a good seating of the upper seat on the lower seat of the valve.

It has been proposed, however, in other environments, to provide a generally aligned floatation valve assembly in a liquid dispensing or liquid/gas separating apparatus. Examples of such assemblies are disclosed in the following U.S. Patents.

| U.S. PAT. NO. | PATENTEE |
| --- | --- |
| 496,994 | Brogan |
| 1,778,437 | Valjean |
| 2,087,913 | Kenney et al. |
| 2,809,712 | Muller |
| 2,827,915 | Mitchell |
| 3,522,013 | Borgeson |

In U.S. Pat. No. 2,827,915 there is disclosed a float valve especially adapted for use in a regenerant tank of a water treatment apparatus. In such apparatus, a float in a water tank has an upper stem which is slidably journalled in an opening in a bracket. The stem is slidably received through the float and has stops on the portion extending above the float and the portion extending below the float. On the upper end of the stem is a slide member which is received within a tubular fitting mounted in an outlet for a water conduit. The lower side of the fitting has a valve seat and the lower end of the slide member has a washer type, valve-forming member mounted thereon which is adapted to seat against the valve seat to close the valve when the water level in the tank reaches a predetermined height.

In U.S. Pat. No. 1,778,437 movement of a float results in movement of a mechanism which raises and lowers a valve stem which extends through the float and which is centered between an upper bore and a lower valve seat for dispensing fluid to a gas burner.

In U.S. Pat. No. 2,087,913 a vertically movable pin is operatively associated with a float. The float is movable on a tubular support member having a valve stem slidably received therein and coupled to the float so that when the float goes up or down the valve stem goes up and down to seat or unseat the lower end of the valve stem on the valve seat. This float valve is utilized in a container for a refrigerating medium.

U.S. Pat. No. 2,809,712 discloses a float which is connected to a stem which is received through an upper locating bore and which has connected to the bottom thereof a cylindrical valve member which is received in a mating cylindrical cavity. Movement of the float up and down causes movement of the cylindrical valve member within the cylindrical cavity to open and close the valve in a gas and liquid separator associated with a gasoline storage tank.

Still another device which uses an aligned valve stem with a float that moves relative to the valve stem for moving the valve stem up and down and which has a floating valve at the bottom thereof is disclosed in U.S. Pat. No. 3,522,013.

As will be described in greater detail hereinafter, the float valve assembly of the present invention differs from the previously proposed cantilevered float valves used in high pressure liquid drain traps and differs from the vertically aligned float valves described above and utilized in other environments, by providing a float valve assembly in a liquid drain trap which has generally vertically aligned upper and lower orifices, the assembly including a float valve having upper and lower coaxial stem-forming members which are received in the respective upper and lower orifices which serve not only as fluid inlet and outlet means but also as valve aligning means for a valve assembly including the lower end of the lower stem-forming member and a valve element in the lower orifice.

SUMMARY OF THE INVENTION

According to the invention there is provided a float valve assembly in a liquid drain trap forming part of a high pressure liquid and gas separating apparatus, said drain trap including a housing having an upper orifice and a lower liquid outlet orifice axially aligned with said upper orifice, and said float valve assembly including a float, upper stem-forming means extending from said float, lower stem-forming means extending from said float and coaxial with said upper stem-forming means, said stem-forming means being fixed relative to said float, said upper and lower stem-forming means being received, respectively, in said upper and lower orifices which function not only as orifices for the ingress and egress of fluids from the drain trap but also as alignment for maintaining said stem-forming means in generally vertical alignment, and a valve in said lower orifice formed between an upper valve seat associated with and movable with said lower stem-forming means and a lower valve seat situated within said lower orifice, the vertical alignment of said stem forming means facilitating positive vertical seating and unseating of said upper valve seat on said lower valve seat.

In one preferred embodiment of the float valve assembly, the stem-forming means are pins and the upper valve seat is formed at and on the lower end of the lower pin. This valve seat can be semispherical or conical and the valve seat in the lower orifice is an O-ring releasably clamped in the lower orifice which is defined by a tubular fitting secured to and in the bottom of the drain trap.

This arrangement provides a very simple valve assembly in that the conical or semispherical lower end of the valve pin is utilized as part of a valve for seating on the O-ring fixed within the fitting.

These two embodiments of the valve can be utilized to allow use of this arrangement for liquids of various specific gravity and at both high and low pressures.

Variations in the size of the O-ring forming the lower valve seat, variations in the choice of "hard" or "soft" O-rings and variations in the size of the orifice can also be made to allow for such differences in pressure and specific gravity.

Also, the use of a standard O-ring that functions as the lower valve seat and the provision of an internal seal within the fitting allows ease of replacement and guarantees fluid compatibility with the material of the O-ring.

Further, with the float valve assembly having the upper and lower pins attached to the float and being piloted at both ends by the upper fitting and lower fitting in the drain trap, and thus held in generally vertical alignment, such arrangement ensures adequate sealing and such assembly obviates problems caused by misalignment, i.e., leaks.

DESCRIPTION OF THE PREFERRED EMBODIMENT(S)

Figure 1:
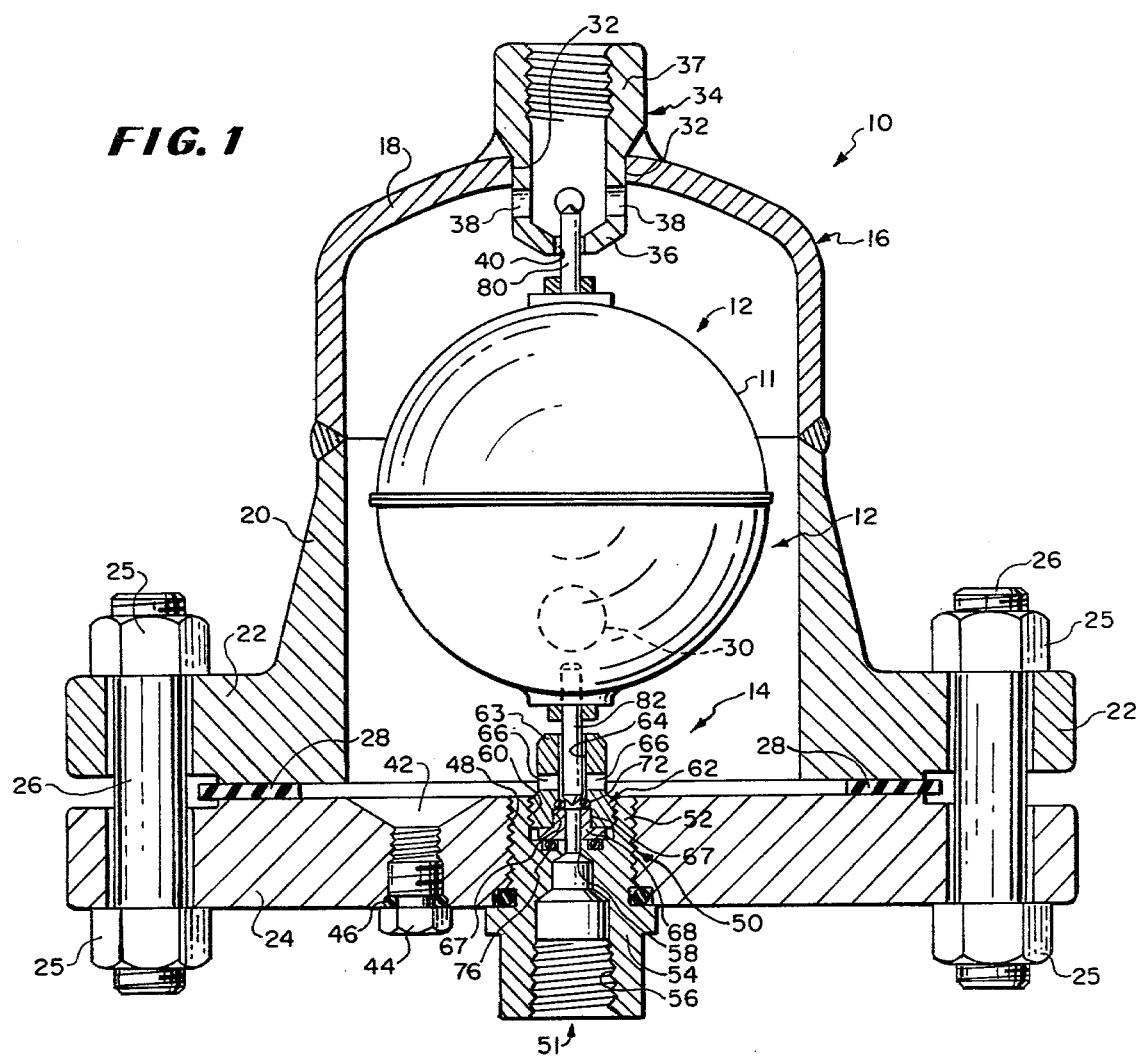
FIG. 1 is a vertical sectional view through a liquid drain trap assembly having therein the float valve assembly of the present invention.

Referring now to FIG. 1 there is illustrated therein a liquid drain trap 10 which is utilized in a high pressure liquid and gas separating apparatus (not shown) such as is found in a nuclear power station. A high pressure radioactive gas containing liquid (water) is passed through the drain trap 10 for condensing liquid in the trap 10 to effect removal of the contaminated liquid from the gas which liquid is then placed in a decontamination storage tank where the radioactivity is allowed to decay. The high pressure gas is often admitted to the lower part of the drain trap 10 and liquid-free gas exits from the upper part of the trap 10. In some drain traps, the liquid-carrying gas is admitted to, and liquid-free gas exits from, the same inlet/outlet opening at the top of the drain trap. Any liquid that condenses and collects in the trap 10 will eventually cause a float 11 of a float valve assembly 12 (which is constructed in accordance with the teachings of the present invention) to raise, thereby to open a valve 14.

As shown in FIG. 1, the drain trap 10 has an upper bell shaped housing 16 including a domed top wall portion 18, a cylindrical side wall portion 20 and an annular bottom flange portion 22. The housing 16 is closed by a bottom plate 24 which is secured by nuts 25 and bolts 26 to the annular flange portion 22 and a gasket 28 is clamped between the annular flange portion 22 and the bottom plate 24.

The cylindrical side wall portion 20 of the housing 16 can have an inlet opening 30 for admitting liquid-carrying gas into the drain trap 10. The top wall portion 18 of the housing 16 has a centrally located outlet opening 32 therein in which is fixed a special couplet fitting 34, such as welding the fitting 34 to the top 18 of the housing 16 with a lower bulb portion 36 of the fitting 34 extending into the housing 16. An upper portion 37 of the fitting 34 is threaded for connecting to a conduit (not shown). In one embodiment, a T pipe joint is connected to the upper portion 37 of the fitting 34 such that the fitting 34 forms a gas inlet/outlet orifice. The lower bulb portion 36 has a plurality, e.g., four, lateral ports 38 and a central bottom port 40. The lateral ports 38 and the bottom port 40 provide passage means for allowing liquid-carrying gas to enter, and liquid-free gas to escape from the drain trap 10.

The bottom plate 24 has a drain outlet 42 which has a plug 44 threadedly secured therein and sealed by means of an O-ring 46.

Figure 2:
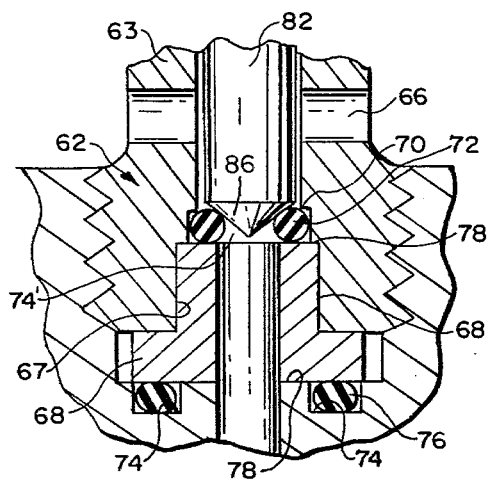
FIG. 2 is a fragmentary enlarged vertical sectional view of one embodiment of the upper valve seat at the lower end of a pin of the float valve assembly of the present invention.
Figure 3:
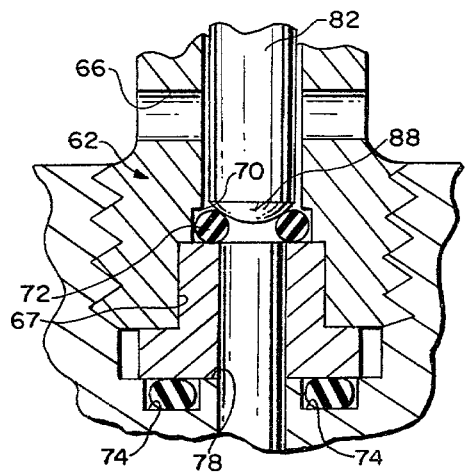
FIG. 3 is a fragmentary enlarged vertical sectional view of another embodiment of the upper valve seat at the lower end of a pin of the float valve assembly of the present invention.

Also, the bottom plate 24 has a centrally located outlet opening 48 which is threaded to receive a special coupling 50. As shown, this coupling 50 has a central passageway 51 therein and an upper portion 52 which is threaded and which is received within the threaded bottom outlet opening 48. A lower portion 54 of the coupling 50 has an internally threaded portion 56 defining part of passageway 51 for connecting to a drain conduit (not shown) for draining liquid from the drain trap 10. As shown, the special coupling 50 is counterbored at each end so as to provide a reduced in diameter passage 58 in the middle of the passageway 51. An upper threaded counterbored portion 60 has a special threaded bushing 62 received therein. The bushing 62 has an upper protruding portion 63, a central bore 64 forming a liquid outlet orifice communicating with the passageway 51, lateral passageways 66 communicating with the central bore 64 and a lower counterbored portion 67 in which is received an annular hat-shaped plug 68. As best shown in FIGS. 2 and 3, the lower counterbored portion 67 has an annular shoulder 70 for trapping an O-ring 72 between the annular plug 68 and the shoulder 70.

Also, the upper counter-bored portion 60 in the coupling 50 has an annular slot 74 for receiving another O-ring 76 for forming a seal between the bottom 78 of the counter-bored portion 60 and the plug 68.

The O-ring 72 has a central passage 74' and forms a lower valve seat of the valve 14 as will be described in greater detail hereinafter. The special bushing 62 and the plug 68 form a simple means (valve housing) for holding the O-ring 72 in a desired location.

According to the teachings of the present invention, the float valve assembly 12 includes the float 11 and the valve 14. The float 11 has an upper pin 80 fixed thereto. Also a lower pin 82 is fixed to the bottom of the float 11 in coaxial alignment with the upper pin 80. As shown, the upper pin 80 is received in the port/orifice 40 and the lower pin 82 is received in the bore/orifice 64 of the bushing 62. The port 40 in the fitting 34 and the bore 64 in the bushing 62 form respective upper and lower outlet orifices, the upper orifice 40 being a gas inlet/outlet orifice and the lower orifice 64 being a liquid outlet orifice. These orifices 40 and 64 are axially aligned so that they can form a means for receiving and vertically aligning the pins 80 and 82 on the float valve 11. That is to say, the pins 80 and 82 are received and guided in the orifices 40 and 64 respectively.

The lower end of the lower pin is formed with either a conical lower end 86 as shown in FIG. 2 or a semispherical lower end 88 as shown in FIG. 3 to define thereby an upper valve seat which seats on the lower valve seat defined by the O-ring 72 trapped within the bushing 62.

In the operation of the drain trap assembly 10, the liquid condensing within the housing 16 will collect on the bottom plate 24, and when it reaches a level where it engages the float 11, it will raise the float 11 thereby to raise the lower pin 82 and the conical or semispherical valve seat 86 or 88 at the lower end thereof off of the lower valve seat defined by the O-ring 72 until sufficient liquid is drained from the trap 10 to cause the float 11 to descend within the housing 16 and seat the valve seat 86 or 88 on the valve seat 72.

The provision of the upper and lower pins 80 and 82 which are received in and guided in the upper port/orifice 40 and the lower bore/orifice 64 ensures generally vertical movement of the float valve assembly 12 upwardly and downwardly. This generally vertical alignment and the maintaining of a generally vertical movement of the float valve assembly 14 ensures, and provides for, good and proper seating of the upper valve seat 86 or 88 on the lower valve seat 72.

Also it will readily be appreciated that replacement of a worn lower valve seat 72 is very easily accomplished by unbolting the bottom plate 24 from the housing 16 and unscrewing the bushing 62 from the threaded counterbore in the coupling 50.

From the foregoing description it will be apparent that the float valve assembly 12 in the liquid drain trap 10 constructed according to the teachings of the present invention has a number of advantages, some of which have been described above and others of which are inherent in the invention. Accordingly, the scope of the claims is only to be limited as necessitated by the accompanying claims.

We claim:

1. A float valve assembly in a liquid drain trap forming part of a high pressure liquid and gas separating apparatus, said drain trap including a housing having an upper orifice and a lower liquid outlet orifice axially aligned with said upper orifice, and said float valve assembly including a float, upper stem-forming means extending from said float, lower stem-forming means extending from said float and coaxial with said upper stem-forming means, said stem-forming means being fixed relative to said float, said upper and lower stem-forming means being received, respectively, in said upper and lower orifices which function not only as orifices for the ingress and egress of fluids from the drain trap but also as alignment means for maintaining said stem-forming means in generally vertical alignment, and a valve in said lower orifice formed between an upper valve seat associated with and movable with said lower stem-forming means and a lower valve seat situated within said lower orifice, the vertical alignment of said stem forming means facilitating positive vertical seating and unseating of said upper valve seat on said lower valve seat, wherein said lower valve seat is an elastomeric O ring fixed within said lower orifice and said upper valve seat is formed at the lower end of said lower stem-forming means, wherein said lower outlet orifice is defined by a tubular fitting received within a lower wall of said housing and having means extending from said housing for connection to a drain conduit and having means within said fitting for mounting said elastomeric O ring, and wherein said fitting has a threaded counterbore opening into said housing and said mounting means includes a bushing having an outer threaded portion threadedly received in said threaded counterbore, said bushing having a central passageway therethrough, a portion of which is sized and adapted to receive said lower valve stem-forming means therein and a larger diameter portion below said stem-forming means-receiving portion forming an annular shoulder for receiving said O ring, and an annular plug received in said lower larger diameter portion for clamping said O ring between said plug and said shoulder, said plug being held between said bushing and the bottom of said counterbore.

2. The assembly according to claim 1 wherein said upper and lower stem-forming means comprise upper and lower pins fixed to upper and lower surfaces of said float in coaxial alignment with each other.

3. The assembly according to claim 2 wherein said lower pin has said upper valve seat formed on the lower end thereof.

4. The assembly according to claim 3 wherein said upper valve seat is a semispherical lower end of said lower pin.

5. The assembly according to claim 3 wherein said upper valve seat is a conical lower end of said lower pin.

6. The assembly according to claim 1 wherein said bushing has one or more lateral ports therein communicating with said central passageway.

7. The assembly according to claim 1 wherein said mounting means include an O ring seal between said plug and the bottom of said counterbore and around an opening in said fitting forming part of said lower orifice.

8. The assembly according to claim 1 wherein said drain trap has a specially configured couplet fitting fixed in an opening in the top thereof to form said upper orifice, said coupling fitting having a portion extending from the drain trap for connection to a conduit and having a bulb portion extending into said drain trap and having a central port therein which is aligned with said lower orifice and which is sized and adapted to receive said upper stem-forming means for maintaining said upper stem-forming means in generally vertical coaxial alignment with said lower stem-forming means.

9. The assembly according to claim 8 wherein said bulb portion has one or more lateral ports for facilitating ingress or egress of fluid through said couplet fitting.

10. The assembly according to claim 9 wherein said central port in said bulb portion of said couplet fitting has a diameter slightly larger than the diameter of said upper stem-forming means for facilitating guiding and aligning said upper stem-forming means.

11. The assembly according to claim 1 wherein the diameter of said central passageway is slightly larger than the diameter of said lower stem forming means to facilitate guiding and aligning of said lower stem-forming means.

* * * * *